United States Patent [19]

Yasuda

[11] Patent Number: 5,231,691
[45] Date of Patent: Jul. 27, 1993

[54] SPEECH RECOGNITION SYSTEM INCLUDING INTERRUPT SCHEME THAT AVOIDS OPERATIONAL AND INTERFACING CONFLICTS

[75] Inventor: Seigou Yasuda, Yokosuka, Japan

[73] Assignee: Ricoh Company, Ltd., Tokyo, Japan

[21] Appl. No.: 593,819

[22] Filed: Oct. 5, 1990

[30] Foreign Application Priority Data

Oct. 6, 1989 [JP] Japan ................................. 1-261295

[51] Int. Cl.⁵ .............................................. G10L 9/00
[52] U.S. Cl. ......................................................... 395/2
[58] Field of Search ................................. 381/41–45; 395/2

[56] References Cited

U.S. PATENT DOCUMENTS

| | | | |
|---|---|---|---|
| 4,677,569 | 6/1987 | Nakano et al. | 381/43 |
| 4,776,016 | 10/1988 | Hansen | 381/42 |
| 4,931,950 | 6/1990 | Isle et al. | 364/513 |

FOREIGN PATENT DOCUMENTS

| | | |
|---|---|---|
| 0191354 | 8/1986 | European Pat. Off. . |
| 3216800 | 12/1982 | Fed. Rep. of Germany . |
| 3129282 | 2/1983 | Fed. Rep. of Germany . |
| 3129353 | 2/1983 | Fed. Rep. of Germany . |

OTHER PUBLICATIONS

Copy of brochure entitled "Voice Master Key A Voice Recognition System." *Voice Master & Speech Thing*, Date Unknown (ordered Feb. 14, 1989, and obtained by inventor on Apr. 12, 1989) Company is Covox Inc.

*Primary Examiner*—Michael R. Fleming
*Assistant Examiner*—Michelle Doerrler
*Attorney, Agent, or Firm*—Mason, Fenwick & Lawrence

[57] ABSTRACT

A speech recognition system in which speech information inputted from a microphone is recognized and a speech signal corresponding to the speech information is generated and converted into a set of characters equivalent to keystroke information normally inputted from a keyboard, the set of characters being supplied to a keyboard buffer, so that an application program running on a computer system executes a desired job. The speech recognition system comprises a first interrupt processing part which, after receiving an interrupt signal due to a depression of a key on the keyboard, checks that information within the keyboard buffer accords with a first predefined keystroke code, turns a first flag ON only when the information accords with the first predefined keystroke code and terminates a first interrupt procedure, and a second interrupt processing part which, after the first interrupt routine is terminated, enables a second interrupt into operation of the application program only when the first flag is turned ON, so that a speech information input procedure is started to provide the keystroke information thus recognized.

8 Claims, 6 Drawing Sheets

FIG.5

SPEECH RECOGNITION SYSTEM INCLUDING INTERRUPT SCHEME THAT AVOIDS OPERATIONAL AND INTERFACING CONFLICTS

BACKGROUND OF THE INVENTION

The present invention generally relates to speech recognition systems, and more particularly to a speech recognition system in which a speech information inputted thereto is recognized and converted into a set of characters equivalent to a keystroke information normally inputted to a keyboard so that the set of characters thus converted is inputted to an existing application program running on a computer system.

A conventional speech recognition system usually employs known techniques of speech input processing and speech recognition which are started by a command transferred from a central processing unit (CPU) of a computer system to the speech recognition system. After the speech input processing and the speech recognition are completed, the conventional speech recognition system supplies results of the speech recognition to the computer system, and a program for running the speech recognition system is placed in a waiting state in which the speech recognition system is waiting for a next command to be received from the CPU. The speech recognition is started by causing the computer system to transfer a command to the speech recognition system. The speech recognition system supplies the recognition results to the computer system in reply to the command transferred each time a speech input request is made so that the computer system performs a desired job. For this purpose, the program which runs the speech recognition system on the computer system must have a routine to make the computer system transfer a start command to the speech recognition system, a routine to supply the recognition results from the speech recognition system to the computer system in reply to the start command, and a routine to urge an operator to input a speech information from a microphone to the speech recognition system each time a speech input request is made. In order to make use of the speech recognition system with several kinds of existing application programs which are commercially available, it is necessary to install the above described several routines into each of these application programs. However, much time and labor to make modifications within the existing application programs to install the above described routines are required to put the conventional speech recognition system into practical use. And, the conventional speech recognition system still has a problem in that a parallel operation for performing a keyboard input processing and a speech input processing in a parallel manner is difficult to carry out and that an operational trouble is often caused in the computer system when such a parallel operation is performed.

Generally, a keyboard interrupt routine is used by the conventional speech recognition system to start the speech input processing. However, there is a problem in that a keyboard interrupt does not necessarily take place at an appropriate time for operation of the computer system. This keyboard interrupt is an external hardware interrupt by which an interrupt signal is supplied each time any key on the keyboard is depressed by an operator to enable an external interrupt into a main application program running on the computer system. However, the concept of choosing an appropriate time for the operations of the computer system in case of an occurrence of a keyboard interrupt cannot be seen in many of the conventional speech recognition systems using a keyboard interrupt routine. Thus, the keyboard interrupt sometimes occurs even at a phase unsuitable for the operation of the computer system. For instance, when the main application program is executing a critical job and is in a "busy" state, the occurrence of the keyboard interrupt may sometimes cause an operational problem of the computer system or other kind of trouble. Accordingly, the above described concept has to be incorporated into the speech recognition system employing a keyboard interrupt routine to develop a useful and reliable system for practical use.

Further, the conventional speech recognition system supplies an interrupt signal when the speech recognition is completed, and this interrupt signal when received is used to allow a set of characters corresponding to the recognition results to be transferred to the keyboard buffer. When the computer system is executing another key input processing and another speech input processing in a parallel manner, there is a possibility that a keyboard information transferred from the keyboard to the keyboard buffer will be destroyed by a speech information obtained through the speech recognition. In addition, in the case of the conventional speech recognition system, it is difficult to modify standardized speech patterns which are generated by a different program in accordance with the speech recognition results and are pre-recorded in a memory provided within the speech recognition system.

SUMMARY OF THE INVENTION

Accordingly, it is a general object of the present invention to provide a novel and useful speech recognition system in which the above described problems are eliminated.

Another and more specific object of the present invention is to provide a speech recognition system which comprises a computer system having a central processing unit for performing a prescribed operation, a keyboard for inputting keystroke information to a keyboard buffer, and a display for outputting information resulting from the prescribed operation by the central processing unit in a visible form, the computer system being capable of executing an application program thereon, a microphone for inputting speech information to the speech recognition and supplying a speech signal corresponding to the speech information, a speech signal processing part for amplifying the speech signal and correcting the amplified speech signal into a first signal, a feature parameter extraction part for analyzing a frequency of the first signal through a predetermined frequency analysis and extracting a set of feature parameters from the first signal, a feature parameter input control part for supplying at prescribed time intervals the set of feature parameters from the first signal to a speech data buffer, a speech section detection part for detecting speech sections of the speech signal by means of the set of feature parameters, the speech section detection part detecting a leading edge of the speech signal, a standardized pattern part for making standardized patterns based on the speech information and for storing the standardized patterns in a standardized pattern memory, a speech recognition part for recognizing the speech information by the set of feature parameters supplied from the feature parameter input control part and by the standardized patterns stored in the standardized pattern memory, the speech recognition part supplying a second signal corresponding to the recognized speech information, an outputting part for converting the second signal supplied from the speech recognition part into a set of characters and transferring the set of characters to the keyboard buffer, a first interrupt processing part for performing a first interrupt procedure, the first interrupt processing part, after receiving an interrupt signal due to a depression of a key on the keyboard, checking that information within the keyboard buffer accords with a first predefined keystroke code, turning a first flag ON only when the information accords with the first predefined keystroke code, and terminating the first interrupt procedure, and a second interrupt processing part for performing a second interrupt procedure, the second interrupt processing part, after the first interrupt routine is terminated, checking that the first flag is turned ON, thus enabling a second interrupt into the operation of the main application program only when the first flag is turned ON, so that a speech information input procedure is started to provide the set of characters in reply to the speech information. According to the present invention, it is possible to produce a keyboard interrupt to start the speech information input procedure by the speech recognition system at an appropriate time, and thus no trouble affecting the operation of the computer system is caused. And, the present invention requires no major change within an existing application program for running on the computer system, and it will facilitate installation of speech recognition system software into the existing application program. Further, it is possible to easily modify the standardized speech patterns pre-recorded in the standardized pattern memory.

Other objects and further features of the present invention will become apparent from the following detailed description when read in conjunction with the accompanying drawings.

DESCRIPTION OF THE PREFERRED EMBODIMENTS

Figure 1:
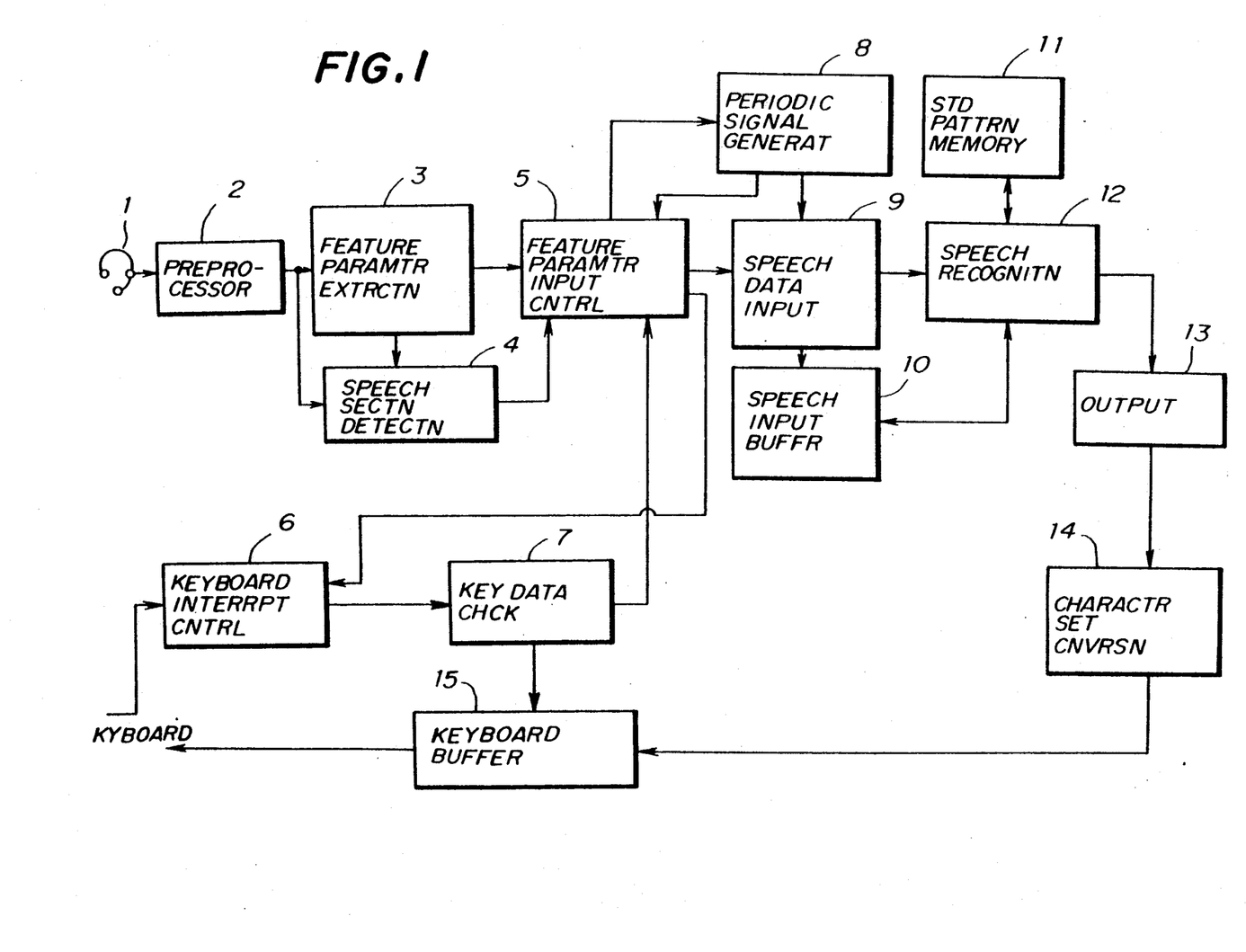
FIG. 1 is a block diagram showing the construction of an embodiment of a speech recognition system according to the present invention.

First, a description will be given of the construction of an embodiment of a speech recognition system according to the present invention, with reference to FIGS. 1 and 2. As shown in FIG. 1, the speech recognition system generally has a microphone 1, a preprocessing part 2, a feature parameter extraction part 3, a speech section detection part 4, a feature parameter input control part 5, a keyboard interrupt control part 6, a key data checking part 7, a periodic pulse generation part 8, a speech data input part 9, a speech input buffer 10, a standardized pattern memory 11, a speech recognition part 12, an output part 13, a conversion part 14, and a keyboard buffer 15. In this speech recognition system, a speech signal inputted from the microphone 1 is amplified and corrected by the preprocessing part 2 to supply a preprocessed signal to the feature parameter extraction part 3, and a frequency of this preprocessed signal is analyzed by the feature parameter extraction part 3 to produce a set of feature parameters that is necessary for a speech recognition process. The frequency analysis is carried out through a well-known process such as power spectrum analysis or LPC cepstrum analysis. And, by means of the preprocessed signal from the preprocessing part 2 and the feature parameters from the feature parameter extraction part 3, the speech section detection part 4 detects speech sections of the speech signal, and supplies a speech section signal to the feature parameter input control part 5. The detected speech sections are in accordance with the feature parameters.

Figure 2:
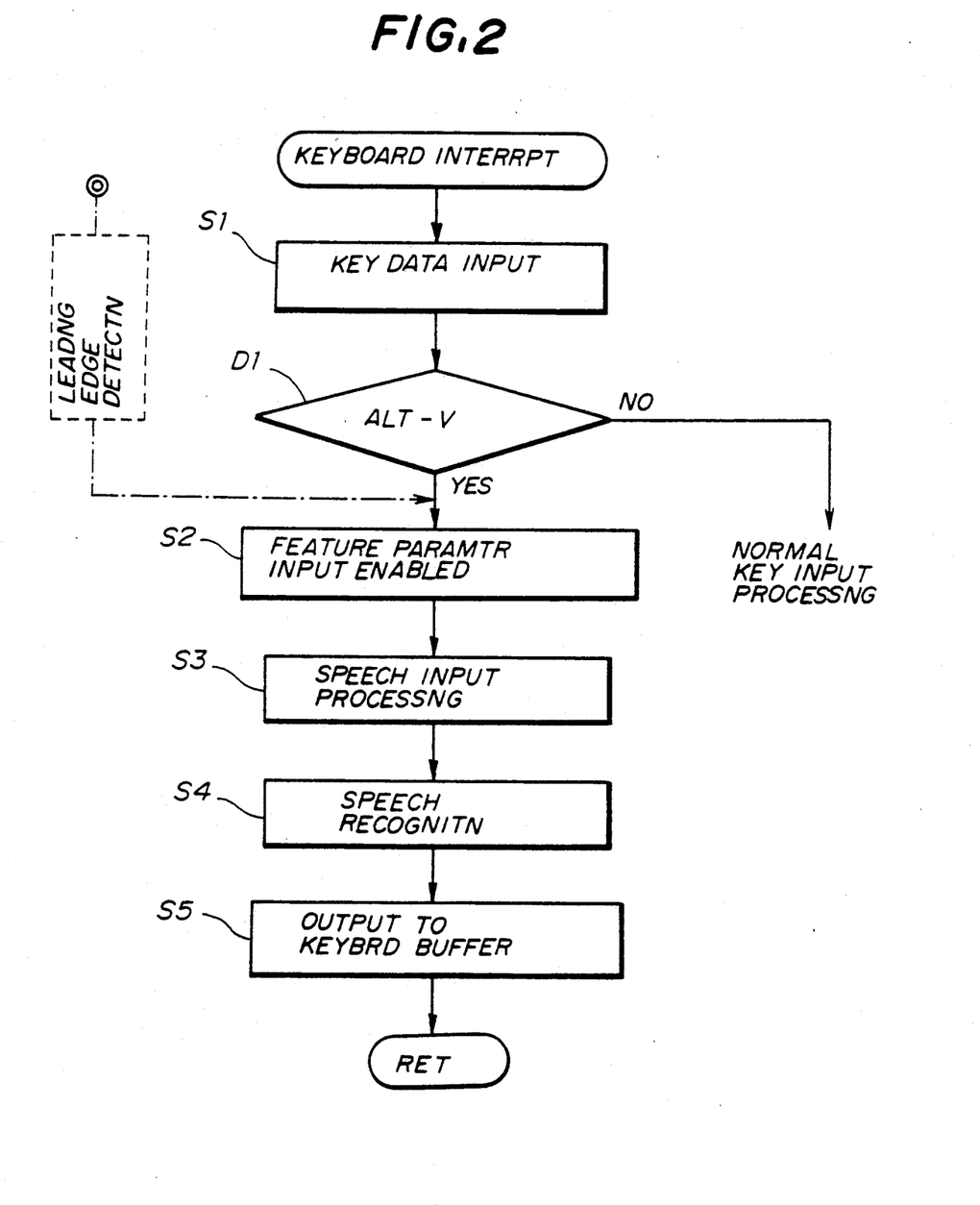
FIG. 2 is a flow chart for explaining the operation of a keyboard interrupt procedure which may be applied to the speech recognition system.

FIG. 2 shows the flow of a keyboard interrupt procedure which may be applied to the speech recognition system according to the present invention. In FIG. 2, a step S1 checks a keystroke data inputted from the keyboard to the computer system (e.g., a personal computer), which is temporarily stored in the keystroke data checking part 7. This checking step is taken based on an interrupt signal which is generated normally when a key on the keyboard is depressed. A decision D1 is made as to whether the keystroke data inputted from the keyboard accords with a first predefined special key which is, for example, a combined keystroke "Alt-V" that is inputted by depressing a character key "V" of the keyboard while a control key "Alt" is depressed. If the inputted keystroke does not accord with the first predefined special key, then a normal key input processing is performed. If it accords with the first predefined special key, then a step S2 transfers a control signal from the key data checking part 7 to the feature parameter input control part 5 to enable a keyboard interrupt. Then, the feature parameter input control part 5 makes the periodic signal generation part 8 supply a periodic signal periodically (e.g., at time intervals of 5 to 20 ms) to the speech data input part 9. A step S3 allows the speech data input part 9 to start a speech input processing in accordance with a supplying of the periodic signal by the periodic signal generation part 8. However, until the speech input processing is started, the speech data input part 9 continuously checks the input of speech information and the input of keystroke information. The speech data input part 9, when the keyboard interrupt is enabled, confirms that the speech section detection part 4 detects a leading edge of the speech signal from the microphone 1, and transfers the set of feature parameters to the speech input buffer 10. A step S4 makes the speech recognition part 12 carry out a speech recognition procedure by means of the set of feature parameters within the speech input buffer 10 and the standardized patterns being pre-recorded in the standardized pattern memory 11. A step S5 makes the speech recognition part 12 supply the resulting signal of recognized speech data to the output part 13, and makes the conversion part 14 convert the resulting signal into a set of characters corresponding to the inputted speech information so that the set of characters is transferred to the keyboard buffer 15. The set of characters being transferred to the keyboard buffer 15 is equivalent to a keystroke command which is normally inputted through the keyboard to the main application program running on the computer system to execute a desired job.

Figure 3A:
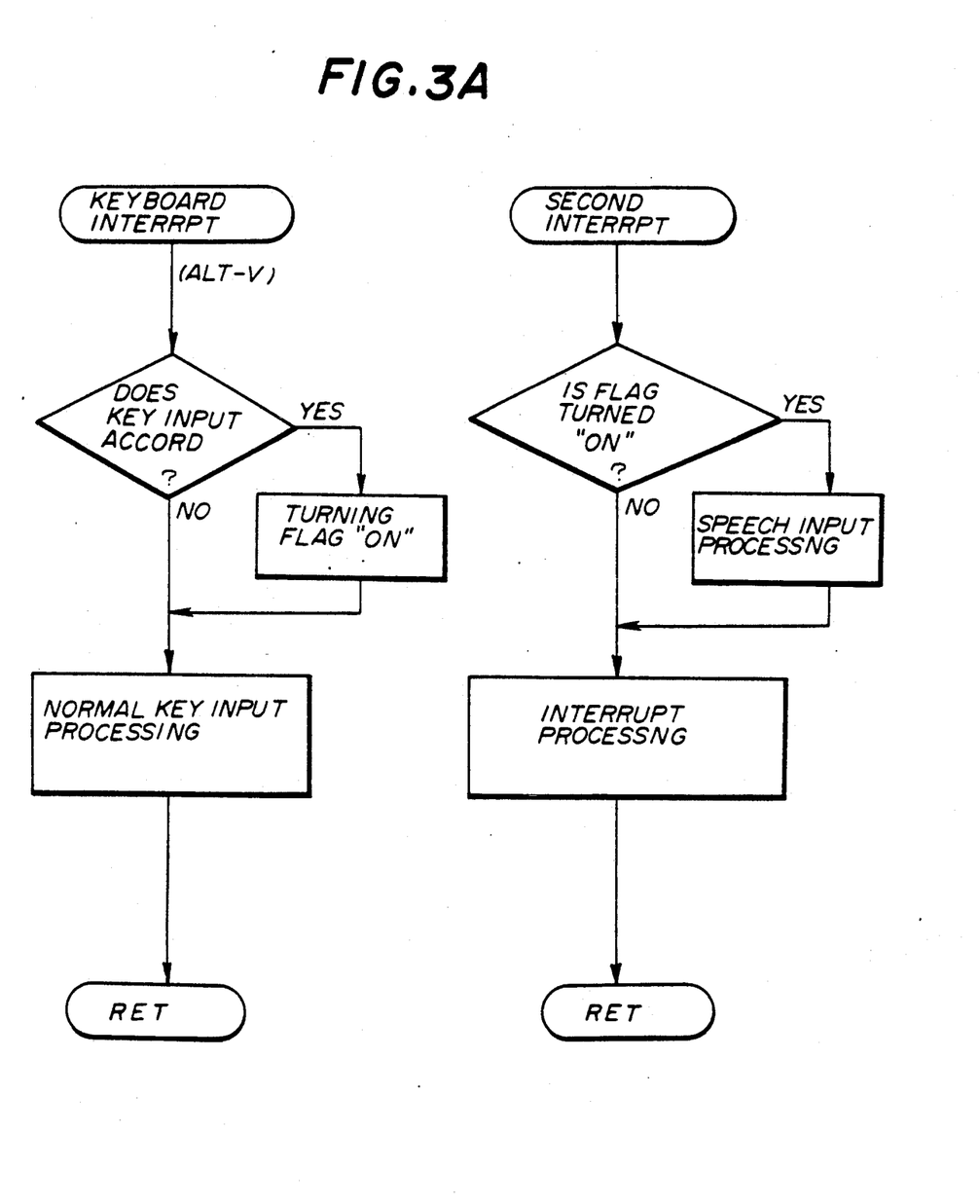
FIGS. 3A and 3B are flow charts for explaining the operation of an embodiment of the speech recognition system when a first predefined special key on a keyboard is depressed.

Next, a description will be given of the operation of the speech recognition system according to the present invention when a special key of the keyboard is depressed to start the speech input processing, with reference to FIGS. 3A and 3B. This special key is predefined to be a first predefined special key, for example, a combined keystroke "Alt-V" as described above. In FIG. 3A, the keyboard interrupt for starting the speech input processing is performed by transferring a keyboard interrupt signal to the feature parameter input control part 5, the keyboard interrupt signal being generated due to a depression of the above special key on the keyboard. Then, a flag provided to check that the depressed key accords with the first predefined special key is turned from OFF to ON, then a normal key input processing is performed. While waiting for an appropriate time for the operation of the computer system, for example, a time when the main application program running on the computer system is in a waiting state, a different interrupt routine checks that the flag is turned ON, then enables the keyboard interrupt to start the speech input processing described above. This keyboard interrupt processing is performed by using an interrupt that may be caused when the computer system is in a stable state for any possible input to the computer system, or in a waiting state in which the keyboard is ready for receiving any key input. It is possible to use, for example, an interrupt routine within a basic input-/output system (BIOS) for this purpose, which is a so-called system call predefined within a disk operating system software, for example, MS-DOS (MicroSoft Disk Operating System). At such an appropriate time for the operation of the computer system, to avoid an unexpected interference by another keyboard interrupt, a keystroke data subsequently inputted from the keyboard when a different keyboard interrupt occurs in the course of the speech input processing is preferentially read out and the speech input processing is cancelled. The speech recognition part 12 performs a speech recognition with the feature parameters within the speech input buffer 10 and the standardized patterns pre-recorded in the standardized pattern memory 11. The results of the speech recognition are supplied to the output part 13, and they are converted by the conversion part 14 into a set of corresponding characters. And these corresponding characters are then transferred to the keyboard buffer 15. The corresponding characters are equivalent to those of a keystroke command normally inputted from the keyboard.

Figure 3B:
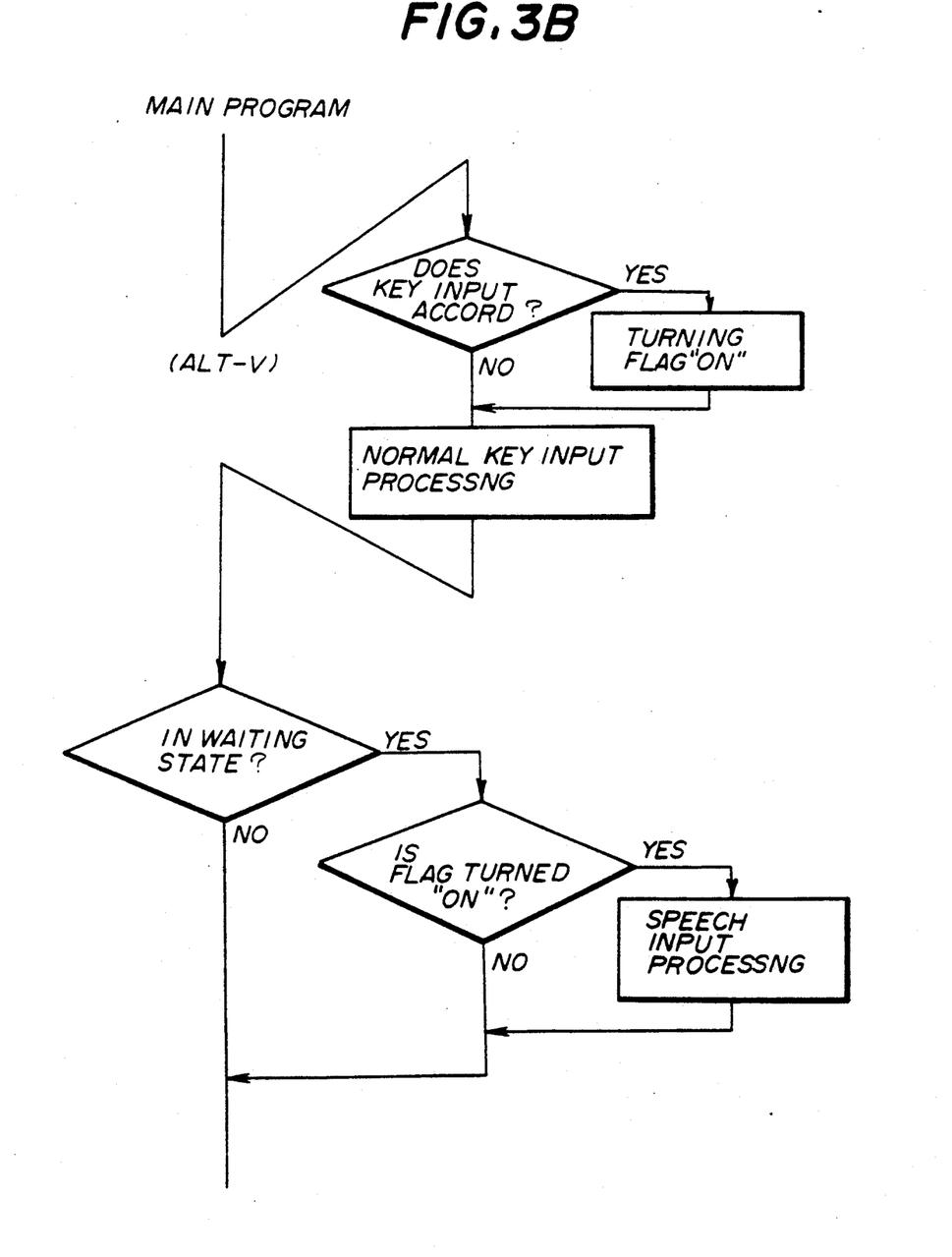

FIG. 3B shows another method of checking the flag to start the speech input processing as described above, which is carried out within the main application program at an appropriate time. As shown in FIG. 3B, when the first predefined special key (e.g., "Alt-V") is depressed, the flag is turned ON and a normal key input processing is performed within the main program running on the computer system. At an appropriate time for the operation of the main application program, which is, for example, a time when the main application program is in a waiting state and not in a "busy" state, whether the flag is turned ON is checked to allow a keyboard interrupt to occur so that a keyboard interrupt signal is transferred to the feature parameter input control part 5. Then the speech input processing is performed, and the inputted speech information is recognized to produce the set of characters corresponding to the speech information. The speech recognition results are transferred to the keyboard buffer 15. Finally, control is transferred to the main application program.

In the foregoing procedure, it is preferred that any interrupt among a plurality of possible interrupts be detected to perform the checking of the flag described above. A case will be considered in which there are provided two interrupt routines, a first interrupt routine and a second interrupt routine. Within the first interrupt routine, an interrupt ma take place when the disk operating system software such as MS-DOS is in a stable state of operation. Within the second interrupt routine, another interrupt may take place when a BIOS interrupt routine for causing a waiting state is called. Detection of an occurrence of either of these interrupts allows the flag to be turned ON, and whether the flag is turned ON is checked to start the speech input processing as described above. When the speech recognition is completed, the flag is turned OFF. In addition, the timing appropriate for operation of the main application program may be checked by a different method. For example, a noise detection part which is provided within the speech recognition system supplies a noise detection signal when a noise occurs during operation of the speech recognition system, and this noise detection signal may be used to check that the flag is turned ON. When there is no source of noise nearby, the computer system is interrupted by this noise detection signal, and a timing of this interrupt may be used to check whether the flag is turned ON or not. If the flag is turned ON, then the computer system transfers a command to the speech recognition system to start the speech information input procedure.

Figure 4:
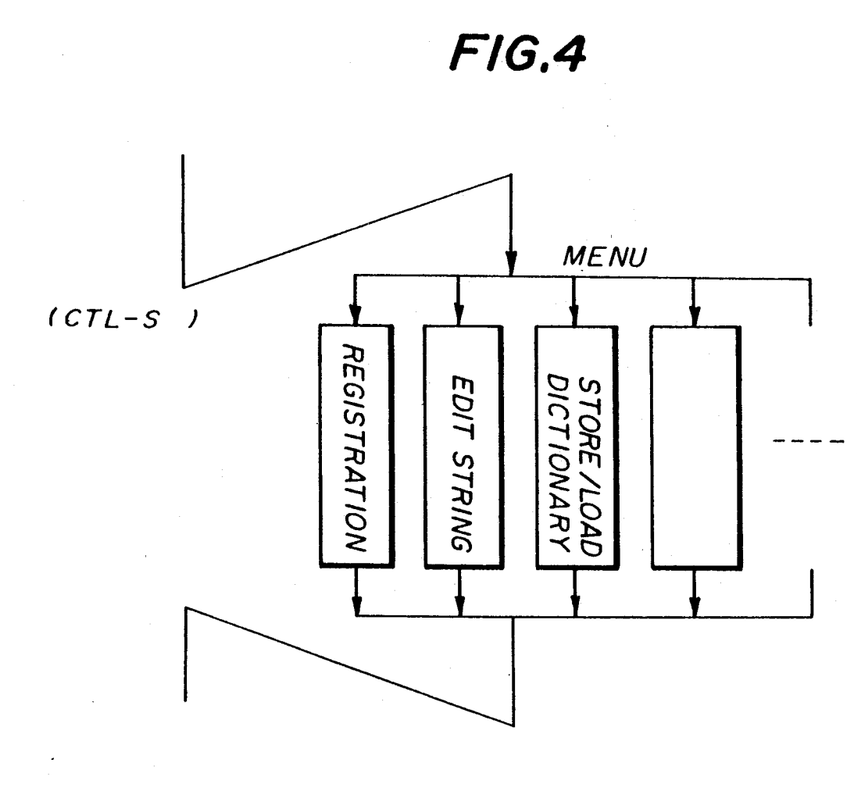
FIG. 4 is a flow chart for explaining the operation of an embodiment of the speech recognition system when a second predefined special key is depressed.

FIG. 4 is a flow chart for explaining another operation of the speech recognition system when a second predefined special key is depressed. This second predefined special key is, for example, a combined keystroke "CTL-S" that is inputted by depressing a character key "S" of the keyboard while a control key "Ctl" is depressed. As shown in FIG. 4, when the second predefined special key on the keyboard is depressed, then the speech recognition system according to the present invention provides an operator with a so-called menu screen on a display of the computer system, and the speech recognition system is placed in a modification mode. In this modification mode, the operator can register a new standardized speech pattern, modify the pre-recorded data of the standardized patterns, and store/-load a standardized pattern dictionary containing reference patterns as the results of speech recognition for each inputted speech data. In other words, using the keyboard and the display, the operator can edit freely the pre-recorded data of the standardized patterns which correspond to the results of the recognition for each speech data. This capability of the speech recognition system is useful when the operator wants to modify quickly the contents of the standardized patterns into any desired patterns.

Figure 5:
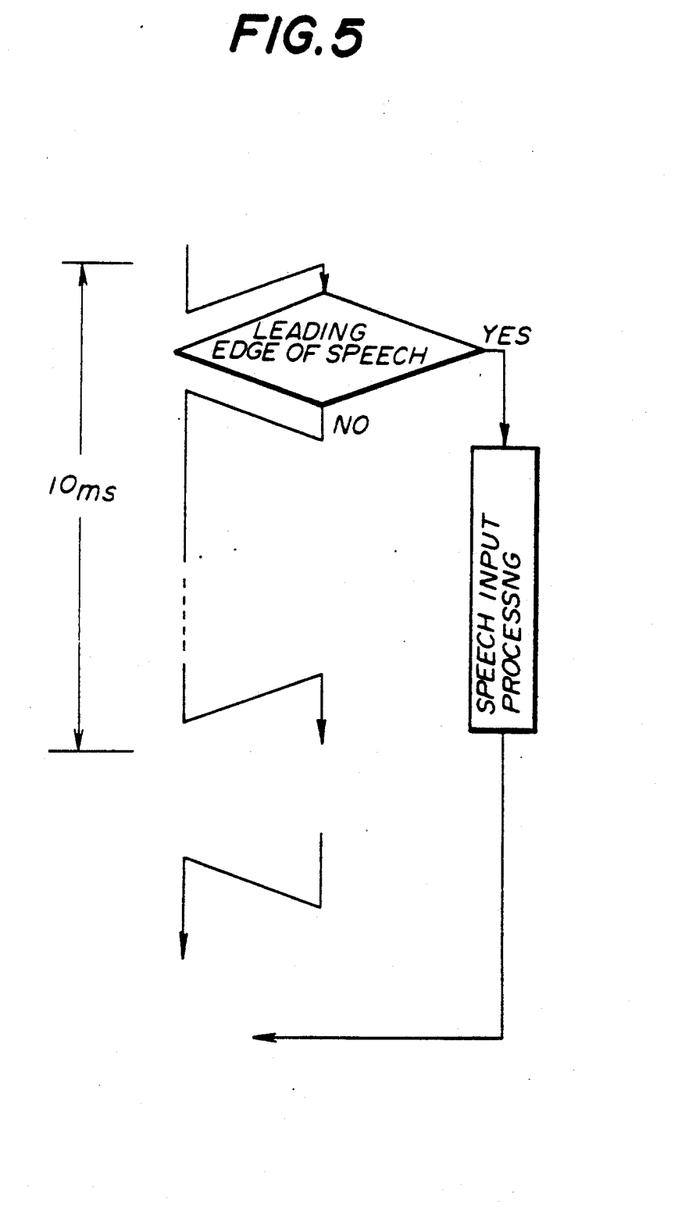
FIG. 5 is a flow chart for explaining the operation of an embodiment of the speech recognition system when a leading edge of a signal generated from a speech command is detected.

FIG. 5 is a flow chart for explaining the operation of an embodiment of the speech recognition system. In this embodiment, a leading edge of an inputted speech signal is detected to start the speech information input processing, as indicated by a dotted line in FIG. 2. The leading edge of the inputted speech signal is periodically detected in accordance with a periodical pulse signal transferred from the periodic pulse generation part 8. For example, the leading edge of the speech signal is detected at time intervals of 10 ms, as indicated in FIG. 5. When the leading edge is detected, an interrupt processing which is similar to the above described keyboard interrupt processing is started. The speech recognition system has another routine to enable such an interrupt processing when the pulse signal from the periodic pulse generation part 8 is received. This interrupt processing is used to carry out the speech input processing and the speech recognition. When another depression of a key on the keyboard prior to the detection of the leading edge of the speech signal interferes with the speech input processing or the speech recognition processing, the keyboard input processing is preferentially performed and the speech input processing and the speech recognition are cancelled. And, a supplying of the set of feature parameters by the feature parameter input control part 5 and an occurrence of the interrupt signal due to the depression of a key on the keyboard are each immediately enabled when the speech information input procedure is started, and a keyboard interrupt caused by the depression of a key on the keyboard is disabled after the speech section detection part 4 detects a leading edge of the speech signal.

Further, the present invention is not limited to the above described embodiments, and variations and modifications may be made without departing from the scope of the present invention.

What is claimed is:

1. A speech recognition system comprising:
   a) a computer system having:
      1) a central processing unit for performing a prescribed operation;
      2) a keyboard for inputting keystroke information to a keyboard buffer; and
      3) a display for outputting information resulting from the prescribed operation by the central processing unit in a visible form;
   the computer system being capable of executing an application program therein;
   b) a microphone for inputting speech information to the speech recognition system and for supplying a speech signal corresponding to the speech information;
   c) speech signal processing means for amplifying the speech signal and for correcting the amplified speech signal into a first signal;
   d) feature parameter extraction means for analyzing a frequency of the first signal through a predetermined frequency analysis and for extracting a set of feature parameters from the first signal;
   e) speech section detection means for detecting speech sections of the speech signal from the set of feature parameters extracted by said feature parameter extraction means by detecting a leading edge of said speech signal from said speech sections of said speech signal;
   f) feature parameter input control means for supplying at prescribed time intervals the set of feature parameters extracted from the first signal to a speech data buffer;
   g) a standardized pattern memory for storing standardized patterns;
   h) speech recognition means for recognizing the speech information by comparing the set of feature parameters within said speech data buffer with the standardized patterns stored in the standardized pattern memory, said speech recognition means supplying a second signal corresponding to the recognized speech information;
   i) outputting means for converting the second signal supplied from the speech recognition means into a set of characters and transferring the set of characters to the keyboard buffer;
   j) first interrupt processing means for performing a first interrupt procedure after receiving a keyboard key depression interrupt signal due to a depression of a key on the keyboard, for detecting whether or not information within the keyboard buffer accords with a first predefined keystroke code, for turning a first flag ON only when the information accords with the first predefined keystroke code, and for terminating the first interrupt procedure; and
   k) second interrupt processing means for performing a second interrupt procedure, the second interrupt processing means, only after the first interrupt procedure is terminated, for detecting whether or not the first flag is turned ON, and for enabling a second interrupt into the operation of the application program only when the first flag is turned ON, so that a speech information input procedure is started to provide the set of characters in replying to the speech information;
   wherein:
      A) immediately when the speech information input procedure is started, said feature parameter input control means is enabled to supply at said prescribed time intervals said set of feature parameters to said speech data buffer, and said interrupt signal is enabled to occur due to the depression of a key on the keyboard; and
      B) after said speech section detection means detects a leading edge of the speech signal, an occurrence of a keyboard interrupt due to the depression of a key on the keyboard is disabled.

2. A speech recognition system as claimed in claim 1, wherein the first interrupt processing means and the second interrupt processing means are provided within the speech recognition system separately from the application program running on the computer system.

3. A speech recognition system as claimed in claim 1, wherein the first interrupt processing means and the second interrupt processing means are provided within the application program, the second interrupt routine being performed only when the application program is in a waiting state.

4. A speech recognition system as claimed in claim 3, wherein the second interrupt processing means checks that the first flag is turned ON only when the application program is in a waiting state.

5. A speech recognition system as claimed in claim 4, wherein the feature parameter input control means comprises a periodic signal generation part for supplying a periodic signal at said prescribed time intervals to the feature parameter input control means and to the speech data buffer, said prescribed time intervals at which the periodic signal generation part supplies the periodic signal being in a range between 5 ms and 20 ms.

6. A speech recognition system as claimed in claim 1, wherein;
   a modification of the standardized patterns stored in the standardized pattern memory is allowed when a second predefined keystroke data is entered from the keyboard.

7. A speech recognition system, comprising:
a) a computer system having:
1) a central processing unit for performing a prescribed operation;
2) a keyboard for inputting keystroke information to a keyboard buffer; and
3) a display for outputting information resulting from the prescribed operation by the central processing unit in a visible form;
the computer system being capable of executing an application program therein;
b) a microphone for inputting speech information to the speech recognition system and for supplying a speech signal corresponding to the speech information;
c) speech signal processing means for amplifying the speech signal and for correcting the amplified speech signal into a first signal;
d) feature parameter extraction means for analyzing a frequency of the first signal through a predetermined frequency analysis and for extracting a set of feature parameters from the first signal;
e) speech section detection means for detecting speech sections of the speech signal from the set of feature parameters extracted by said feature parameter extraction means by detecting a leading edge of said speech signal from said speech sections of said speech signal;
f) feature parameter input control means for supplying at prescribed time intervals the set of feature parameters extracted from the first signal to a speech data buffer;
g) a standardized pattern memory for storing standardized patterns;
h) speech recognition means for recognizing the speech information by comparing the set of feature parameters within said speech data buffer with the standardized patterns stored in the standardized pattern memory, said speech recognition means supplying a second signal corresponding to the recognized speech information;
i) outputting means for converting the second signal supplied from the speech recognition means into a set of characters and transferring the set of characters to the keyboard buffer;
j) first interrupt processing means for performing a first interrupt procedure after receiving a keyboard key depression interrupt signal due to a depression of a key on the keyboard, for detecting whether or not information within the keyboard buffer accords with a first predefined keystroke code, turning a first flag ON only when the information accords with the first predefined keystroke code, and for terminating the first interrupt procedure; and
k) second interrupt processing means for performing a second interrupt procedure, the second interrupt processing means, only after the first interrupt procedure is terminated, for detecting whether or not the first flag is turned ON, and for enabling a second interrupt into the operation of the application program only when the first flag is turned ON, so that a speech information input procedure is started to provide the set of characters in replying to the speech information;
wherein a supplying of the set of feature parameters by the feature parameter input control means, and an occurrence of the interrupt signal due to the depression of a key on the keyboard, are each enabled immediately when the speech information input procedure is started; and
wherein a keyboard interrupt caused by the depression of a key on the keyboard is disabled after the speech section detection means detects a leading edge of the speech signal.

8. A speech recognition system, comprising:
a) a computer system having:
1) a central processing unit for performing a prescribed operation;
2) a keyboard for inputting keystroke information to a keyboard buffer; and
3) a display for outputting information resulting from the prescribed operation by the central processing unit in a visible form;
the computer system being capable of executing an application program therein;
b) a microphone for inputting speech information to the speech recognition system and for supplying a speech signal corresponding to the speech information;
c) speech signal processing means for amplifying the speech signal and for correcting the amplified speech signal into a first signal;
d) feature parameter extraction means for analyzing a frequency of the first signal through a predetermined frequency analysis and for extracting a set of feature parameters from the first signal;
e) speech section detection means for detecting speech sections of the speech signal from the set of feature parameters extracted by said feature parameter extraction means by detecting a leading edge of said speech signal from said speech sections of said speech signal;
f) feature parameter input control means for supplying at prescribed time intervals the set of feature parameters extracted from the first signal to a speech data buffer;
g) a standardized pattern memory for storing standardized patterns;
h) speech recognition means for recognizing the speech information by comparing the set of feature parameters within said speech data buffer with the standardized patterns stored in the standardized pattern memory, said speech recognition means supplying a second signal corresponding to the recognized speech information;
i) outputting means for converting the second signal supplied from the speech recognition means into a set of characters and transferring the set of characters to the keyboard buffer;
j) first interrupt processing means for performing a first interrupt procedure after receiving a keyboard key depression interrupt signal due to a depression of a key on the keyboard, for detecting whether or not information within the keyboard buffer accords with a first predefined keystroke code, for turning a first flag ON only when the information accords with the first predefined keystroke code, and for terminating the first interrupt procedure; and
k) second interrupt processing means for performing a second interrupt procedure, the second interrupt processing means, only after the first interrupt procedure is terminated, for detecting whether or not the first flag is turned ON, and for enabling a second interrupt into the operation of the application program only when the first flag is turned ON, so that a speech information input procedure is started to provide the set of characters in replying to the speech information;

wherein the feature parameter input control means includes a periodic signal generation part for supplying a periodic signal at said prescribed time intervals to the feature parameter input control means and to the speech data buffer, said prescribed time intervals at which the periodic signal generation part supplies the periodic signal being in a range of between 5 and 20 ms.

* * * * *